(12) United States Patent
Kim et al.

(10) Patent No.: US 9,064,176 B2
(45) Date of Patent: Jun. 23, 2015

(54) APPARATUS FOR MEASURING TRAFFIC USING IMAGE ANALYSIS AND METHOD THEREOF

(71) Applicant: Industry-University Cooperation Foundation Hanyang University, Seoul (KR)

(72) Inventors: Whoi-Yul Kim, Seoul (KR); Gwang-Gook Lee, Gyeonggi-do (KR)

(73) Assignee: Industry-University Cooperation Foundation Hanyang University, Seoul (KR)

(*) Notice: Subject to any disclaimer, the term of this patent is extended or adjusted under 35 U.S.C. 154(b) by 164 days.

(21) Appl. No.: 13/754,434

(22) Filed: Jan. 30, 2013

(65) Prior Publication Data

US 2013/0195317 A1    Aug. 1, 2013

Related U.S. Application Data

(60) Provisional application No. 61/592,679, filed on Jan. 31, 2012.

(51) Int. Cl.
*G06K 9/46* (2006.01)
*G06K 9/00* (2006.01)
*G06T 7/20* (2006.01)

(52) U.S. Cl.
CPC .............. *G06K 9/46* (2013.01); *G06K 9/00778* (2013.01); *G06T 7/2006* (2013.01); *G06T 2207/20144* (2013.01); *G06T 2207/30196* (2013.01)

(58) Field of Classification Search
CPC ........................................................ G06K 9/46

USPC .......................................................... 382/103
See application file for complete search history.

(56) References Cited

U.S. PATENT DOCUMENTS

2006/0262857 A1    11/2006  Iwasaki et al.
2008/0294476 A1*   11/2008  Dupre et al. ...................... 705/7
2009/0180583 A1*   7/2009   Park et al. ......................... 377/9

OTHER PUBLICATIONS

Development of a Block-Based Real-Time People Counting System. Hyun Hee Park, Hyung Gu Lee, Seung-In Noh, and Jaihie Kim. 2006.*
Block-Based Temporal Analysis of Video Segments to Detect Moving and Stationary Vehicles. Juergen Carstens. IP.com 2006.*

* cited by examiner

*Primary Examiner* — Stephen R Koziol
*Assistant Examiner* — Delomia Gilliard
(74) *Attorney, Agent, or Firm* — Osha Liang LLP (57) ABSTRACT

Disclosed are an apparatus and method for measuring traffic of moving objects by analyzing an image expressed in a spatiotemporal domain. The traffic measuring apparatus includes a feature extraction unit that sets a virtual measurement line in an input image, generates a spatiotemporal domain image expressing the input image in a spatiotemporal domain based on the virtual measurement line, and extracts image features from the spatiotemporal domain image, and a traffic estimation unit that estimates the number of objects passing the virtual measurement line by accumulating the image features over time. Accordingly, the traffic measuring apparatus may accurately measure in real-time the traffic of objects such as pedestrians through analysis of the input image so as to be utilized in a variety of fields.

17 Claims, 7 Drawing Sheets

POSITION OF PIXEL(s)

APPARATUS FOR MEASURING TRAFFIC USING IMAGE ANALYSIS AND METHOD THEREOF

BACKGROUND

1. Technical Field

Example embodiments of the present invention relate in general to traffic measurement and more specifically to an apparatus for measuring traffic of moving objects by analyzing an image expressed in a spatiotemporal domain.

2. Related Art

Wireless positioning technology is technology for measuring positions of nodes of which positions are not fixed like mobile terminals, and a variety of methods for improving positioning performance have been proposed.

In public areas where pedestrian traffic is heavy, such as airports, shopping malls, complex buildings, and the like, video surveillance using CCTV or the like is generally performed. In addition, an image generating device may be individually installed and operated in a variety of positions in order to achieve security and safety management, and video data generated by the image generating device may be provided to a central monitoring center to be monitored by an operator.

In recent years, a variety of attempts to utilize the video data acquired by the image generating device as an application of pedestrian traffic measurement in addition to the security and the safety management have been made.

A system for pedestrian traffic measurement in the related art has used a camera that has been perpendicularly installed on the ceiling of a passage or the like. The system captures images while overlooking heads of pedestrians, and the captured images may be analyzed by an embedded system mounted in an image analysis server or a camera. In a process of analyzing the images, the number of people passing in an observation area may be measured by segmenting and tracking moving objects within the video.

In addition, a method for measuring pedestrian traffic using a camera having an inclined point of view which is different from the camera perpendicularly installed has been proposed. Here, individuals are primarily detected within the video using a statistical classifier, and then pedestrian traffic in the observation area may be measured by tracking motions of the detected individuals.

However, in the method of using the perpendicularly installed camera, an image analysis algorithm is significantly limited to the point of view of the camera, and therefore it is difficult to apply to images unless the images are obtained from a substantially perpendicularly installed camera. In addition, CCTV cameras are installed for the purpose of video surveillance in most buildings, and such cameras generally have an inclined point of view in order to observe a wide area, and therefore there is a problem that a separate camera system has to be constructed for the method using the perpendicularly installed camera.

Since the method for measuring pedestrian traffic by detecting individuals from a camera having the inclined point of view uses detection and tracking of humans, a computation amount is significantly increased to make real-time execution difficult. That is, in the detection and tracking of humans, a computation amount is significantly increased according to an increase in the number of pedestrians within the video, and therefore there is a problem that accuracy is reduced according to the increase in the number of pedestrians.

SUMMARY

Accordingly, example embodiments of the present invention are provided to substantially obviate one or more problems due to limitations and disadvantages of the related art.

Example embodiments of the present invention provide an apparatus for accurately measuring traffic of objects such as pedestrians in real-time by analyzing an image expressed in a spatiotemporal domain.

Example embodiments of the present invention also provide a method for accurately measuring traffic of objects such pedestrians in real-time by analyzing an image expressed in a spatiotemporal domain.

In some example embodiments, an apparatus for measuring traffic includes: a feature extraction unit that sets a virtual measurement line in an input image, generates a spatiotemporal domain image expressing the input image in a spatiotemporal domain based on the virtual measurement line, and extracts image features from the spatiotemporal domain image; and a traffic estimation unit that estimates the number of objects passing the virtual measurement line by accumulating the image features over time.

Here, the spatiotemporal domain image may be generated by connecting corresponding pixels on each of consecutive frames constituting the input image with respect to the virtual measurement line.

In addition, the image features may be foreground pixels expressing the objects or motion vectors with respect to the foreground pixels.

In addition, the objects may be pedestrians.

In addition, the feature extraction unit may include a foreground segmentation unit that extracts foreground pixels expressing the objects from the spatiotemporal domain image based on pixels positioned on the virtual measurement line, and a motion estimation unit that extracts, from the spatiotemporal domain, motion vectors with respect to the foreground pixels using the pixels positioned on the virtual measurement line.

In addition, the traffic estimation unit may normalize the foreground pixels, accumulate the normalized foreground pixels to thereby calculate a traffic estimation value, and estimate the number of the objects passing the virtual measurement line through the traffic estimation value.

In addition, the traffic estimation unit may calculate the traffic estimation value by reflecting the motion vectors with respect to the foreground pixels in the normalized foreground pixels.

In addition, the traffic estimation unit may correct the traffic estimation value by applying a nonlinear regression model to the traffic estimation value, and estimate the number of the objects passing the virtual measurement line through the corrected traffic estimation value.

In addition, the traffic estimation unit may correct the traffic estimation value by applying the nonlinear regression model expressed as an exponential function to the traffic estimation value.

In other example embodiments, a method for measuring traffic which is performed in an information processing device enabling digital signal processing includes: setting a virtual measurement line in an input image and generating a spatiotemporal domain image expressing the input image in a spatiotemporal domain based on the virtual measurement line; extracting image features from the spatiotemporal domain image; and estimating the number of objects passing the virtual measurement line by accumulating the image features over time.

Here, the input image is obtained through a camera having an inclined point of view.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise" It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Typically, a moving picture may be constituted of a series of pictures, and it can be understood by those skilled in the art that the term "picture" described below may be replaced with other terms having the same meaning such as image, frame, or the like.

Hereinafter, preferred embodiments of the present invention will be described in detail with reference to the accompanying drawings.

Figure 1A:
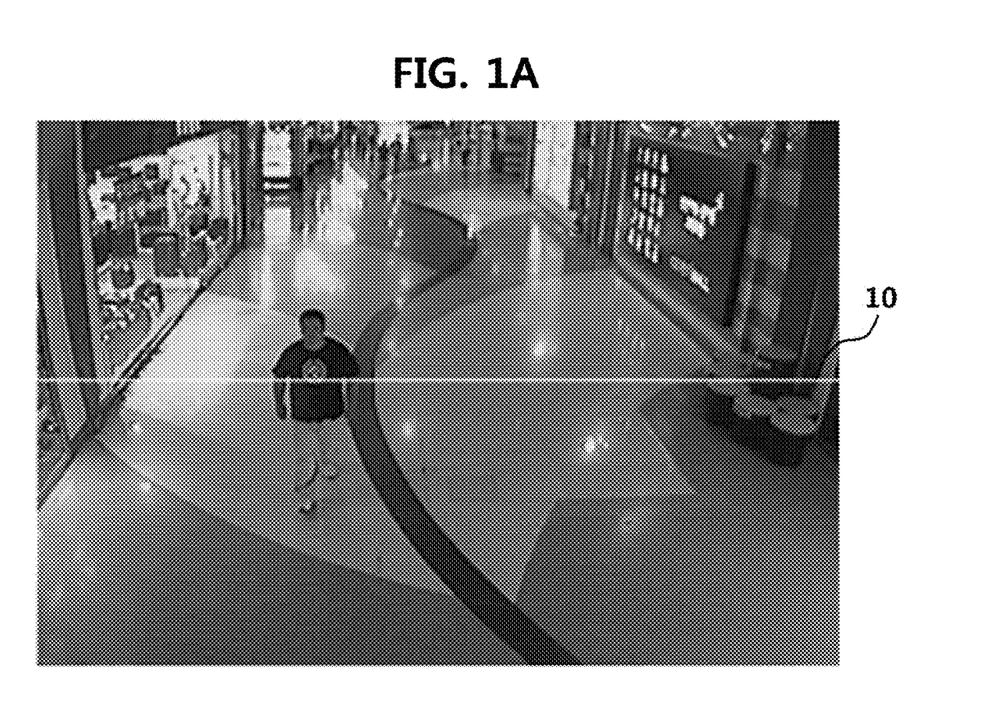
FIG. 1A is a drawing showing an example of an input image in which a virtual measurement line is set according to an embodiment of the present invention.
Figure 1B:
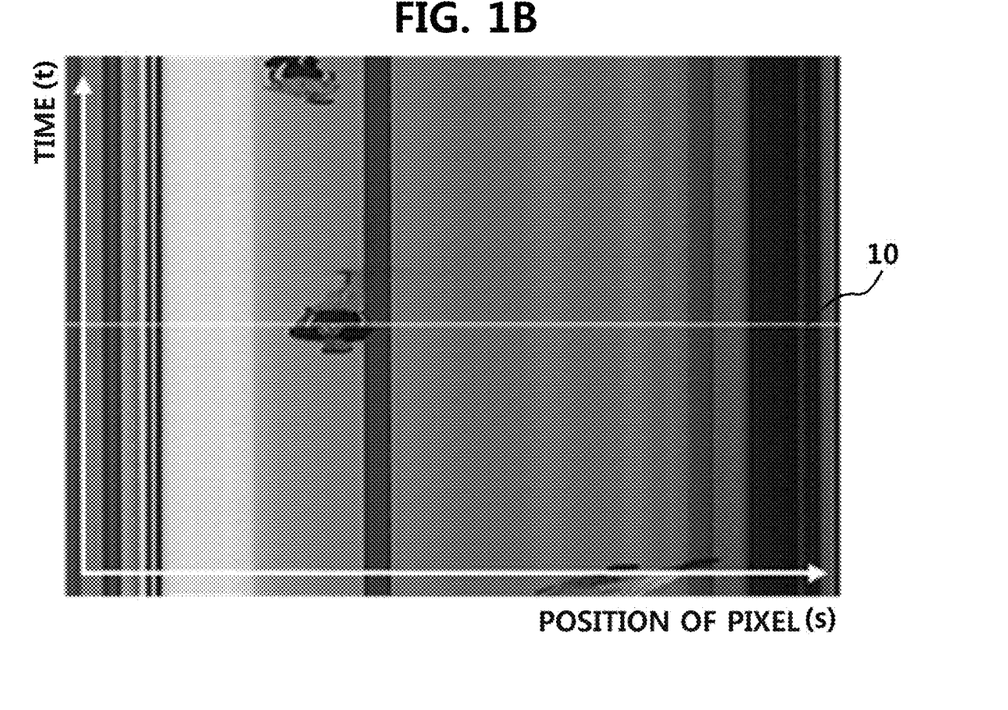
FIG. 1B is a drawing showing an example of a spatiotemporal domain image according to an embodiment of the present invention.

FIG. 1A is a drawing showing an example of an input image in which a virtual measurement line is set according to an embodiment of the present invention, and FIG. 1B is a drawing showing an example of a spatiotemporal domain image according to an embodiment of the present invention.

Referring to FIG. 1A, the input image may include images which are captured at predetermined time intervals. That is, the input image may refer to an image captured using CCTV or the like, and a frame rate, resolution, and the like of the image may vary depending on a shooting place or a shooting site. In addition, the input image may be an image obtained through a camera having an inclined point of view.

It is possible to more accurately detect a moving object along with an increase in the frame rate and resolution of the input image, but a data processing amount may be increased.

For example, in the input image, the frame rate may be low in an environment in which motion of objects is relatively slow such as in building's entrance or hallway, and the frame rate may be high in an environment in which the motion of the objects is relatively fast such as on the road.

According to an embodiment of the present invention, a virtual measurement line 10 may be set in the input image, and the number of objects passing the virtual measurement line 10 may be measured. The virtual measurement line 10 may be set in an area with frequent entrance and exit of the objects such as building's entrance or the like, and may be referred to as a virtual gate.

Referring to FIG. 1B, the input image may be expressed in a spatiotemporal domain.

The input image may be expressed in the spatiotemporal domain by connecting corresponding pixels on each of consecutive frames constituting the input image with respect to the set virtual measurement line 10, and the image expressed in the spatiotemporal domain may be referred to as a spatiotemporal domain image. Here, the spatiotemporal domain image may be represented by time (t) and pixel position (s).

That is, the input image may include consecutive frames that change over time, and a pixel position may be moved on each frame in accordance with movement of the object. For example, the spatiotemporal domain image expressed in the spatiotemporal domain may be generated by connecting the corresponding pixels on each frame. Accordingly, the spatiotemporal domain image may include information about movement of the pixel position over time unlike a general image.

Figure 2:
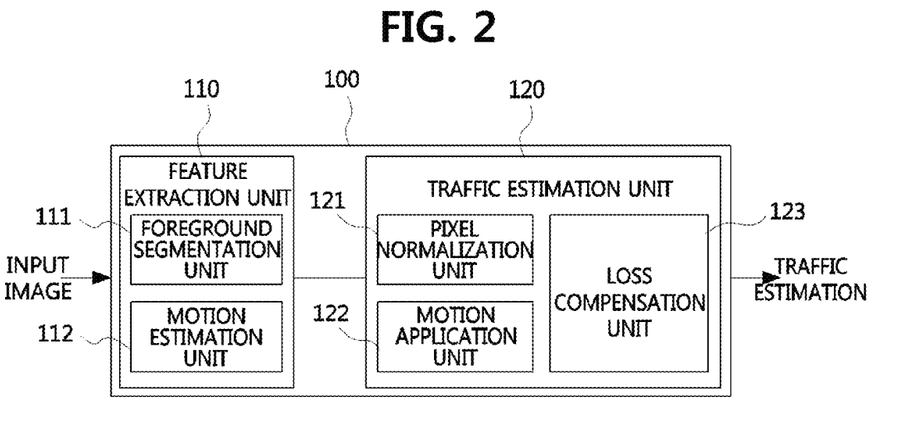
FIG. 2 is a block diagram showing a traffic measuring apparatus according to an embodiment of the present invention.

FIG. 2 is a block diagram showing a traffic measuring apparatus according to an embodiment of the present invention.

Referring to FIG. 2, a traffic measuring apparatus 100 according to an embodiment of the present invention includes a feature extraction unit 110 and a traffic estimation unit 120.

The feature extraction unit 110 may set the virtual measurement line 10 in an input image, and generate a spatiotemporal domain image expressing the input image in a spatiotemporal domain based on the virtual measurement line 10.

In addition, the feature extraction unit 110 may extract image features through analysis with respect to the spatiotemporal domain image.

Specifically, the feature extraction unit 110 includes a foreground segmentation unit 111 and a motion estimation unit 112.

The foreground segmentation unit 111 may segment a background domain and a foreground domain from the spatiotemporal domain image. Here, the foreground domain may refer to an area in which moving objects are present.

The foreground domain in which the moving objects are present has different image features from the background domain. That is, compared to the background domain, the foreground domain has complex motions or colors or clear edges. For example, the foreground domain may be extracted by removing the previously stored background domain from the input image.

In particular, according to an embodiment of the present invention, the foreground segmentation unit 111 may extract, from the spatiotemporal domain image, foreground pixels expressing objects based on pixels positioned on the virtual measurement line 10. The pixels positioned on the virtual measurement line 10 may be segmented into pixels expressing the background and pixels expressing the moving objects, and the foreground segmentation unit 111 may extract the foreground pixels expressing the moving objects from the pixels positioned on the virtual measurement line 10.

The motion estimation unit 112 may extract, from the spatiotemporal domain image, motion vectors with respect to the foreground pixels using the pixels positioned on the virtual measurement line 10.

Since the foreground pixels express the moving objects, the foreground pixels may include information about the motion vectors. Here, the motion vectors may include size and direction components.

For example, the objects may move in a direction in which the objects enter or exit a building or the like with respect to the virtual measurement line 10. That is, the motion vectors may include information about movement direction and speed of the moving objects.

Accordingly, the traffic measuring apparatus 100 according to an embodiment may distinguish objects that enter and exit the building or the like to thereby measure traffic. In particular, according to an embodiment of the present invention, the moving objects may refer to pedestrians that enter and exit buildings or the like.

The traffic estimation unit 120 may accumulate the image features over time, and estimate the number of the objects passing the virtual measurement line 10. The image features may refer to the foreground pixels and the motion vectors with respect to the foreground pixels.

Specifically, the traffic estimation unit 120 includes a pixel normalization unit 121 and a motion application unit 122.

The pixel normalization unit 121 may normalize the foreground pixels extracted by the foreground segmentation unit 111. Sizes of the foreground pixels may differ depending on the influence of camera perspective.

For example, foreground pixels with respect to an object located far away from a camera may be expressed large, and foreground pixels with respect to an object located close to the camera may be expressed small. That is, since the foreground pixels extracted from mutually different objects may have different sizes, a degree to which the foreground pixels contribute to estimation of traffic may vary.

Accordingly, the pixel normalization unit 121 according to an embodiment of the present invention may normalize the foreground pixels based on an average size of the objects (people) corresponding to a position of each object, and accumulate the normalized foreground pixels to thereby calculate a traffic estimation value.

The motion application unit 122 may enable the motion vectors with respect to the foreground pixels extracted from the motion estimation unit 112 to be reflected in the normalized foreground pixels.

The motion application unit 122 may estimate traffic based on the motion vectors with respect to the foreground pixels. That is, the motion application unit 122 may measure the traffic by reflecting information about the movement direction and speed of the objects.

For example, the motion application unit 122 may multiply the foreground pixels by a size component of the motion vectors, and reflect a direction component using a method of projecting the motion vectors on the virtual measurement line 10.

Accordingly, the motion application unit 122 may reflect the motion vectors with respect to the foreground pixels so that a traffic estimation value may be calculated.

In addition, the traffic estimation unit 120 may further include a loss compensation unit 123.

When the traffic is large, objects may be viewed in the input image in an overlapping manner. When the objects are viewed in the overlapping manner, the traffic estimated through analysis of the image may be measured smaller than an actual traffic amount.

When a region in which objects are viewed in the overlapping manner is referred to as an occlusion region, a loss with respect to the image features extracted from the feature extraction unit 110 may occur due to the occlusion region. Accordingly, it is necessary to compensate for the loss of the image features.

The loss compensation unit 123 according to an embodiment of the present invention may correct the traffic estimation value by applying a nonlinear regression model to the traffic estimation value, and estimate the number of objects passing the virtual measurement line 10 through the corrected traffic estimation value.

For example, the loss compensation unit 123 may compensate the image features that can be lost when the traffic is heavy by applying the nonlinear regression model expressed as an exponential function to the traffic estimation value.

A traffic estimation process with respect to objects such as pedestrians which may be performed by the traffic measuring apparatus 100 according to an embodiment of the present invention will be described using the following Equation 1.

$$F_k(t_1, t_2) = \sum_{t=t_1}^{t_2} \sum_{s=1}^{N} \alpha \cdot \rho(s) \cdot \|v(t, s)\| \cdot |\cos\theta_v| \cdot fg(t, s) \cdot \delta(k, d(t, s))$$ [Equation 1]

In Equation 1, $F_k(t_1, t_2)$ denotes a value obtained by estimating traffic occurring between a time $t_1$ and a time $t_2$. When $\delta(i, j)$ that is a delta function satisfies I=j, 1 may be obtained, and otherwise (I≠j), "0" may be obtained. In $\delta(k, d(t, s))$, $d(t, s)$ denotes a movement direction of the foreground pixels. Accordingly, traffic amounts may be separately calculated depending on a movement direction k (+1 or −1).

For example, it is assumed that a case in which an object enters a building or the like with respect to the virtual measurement line 10 is k=+1, and a case in which the object exits the building is k=−1.

In addition, based on results obtained by extracting the foreground pixels, when a corresponding pixel (t, s) is the foreground pixel, fg(t, s) may be set as 1, and otherwise set as "0". Here, s may denote a pixel position on the virtual measurement line 10, and N may denote the number of a total of pixels on the virtual measurement line 10.

In addition, $\rho(s)$ denotes a parameter for normalizing a size of the foreground pixel from the influence of the camera perspective, and $\alpha$ denotes a coefficient for correcting a difference between a block (rectangle) in which an object is positioned in the image and an actual area occupied by the object, which may be experimentally determined.

In addition, each of v(t, s) and $\cos\theta_v$ denotes a parameter for reflecting a motion vector with respect to the pixel (t, s). Here, v(t, s) may indicate a size component, and $\cos\theta_v$ may indicate a direction component. Here, $\theta_v$ may denote an angle formed between the motion vector and a vertical direction of the virtual measurement line 10.

For example, the appearance of each of pedestrians viewed in a spatiotemporal domain is closely related to the movement speed and movement direction of the pedestrians. A slow-moving pedestrian may be viewed with a long trajectory in the spatiotemporal domain compared to a fast-moving pedestrian.

In addition, a pedestrian passing the virtual measurement line 10 in an inclined manner may be viewed inclinedly in the spatiotemporal domain.

Referring to Equation 1, in order to correct the traffic that is estimated in the spatiotemporal domain depending on the movement speed of the pedestrian, the size component of the motion vector may be multiplied. In addition, in order to reflect only the pedestrians passing the virtual measurement line 10 in the traffic measurement result, the motion vector may be used which is projected in a vertical direction of the virtual measurement line 10 by multiplying $\cos\theta_v$ that is the direction component.

Accordingly, using Equation 1, the foreground pixels in which the motion vector is reflected among N pixels on the virtual measurement line 10 between the time $t_1$ and the time $t_2$ may be accumulated, and then the accumulation result may be provided as the traffic estimation value ($F_k$).

In addition, since the objects are viewed in the overlapping manner when the traffic is heavy, in order to solve a problem that the traffic estimated through analysis of the image is measured smaller than the actual traffic, the traffic estimation value ($F_k$) may be corrected using the following Equation 2.

$$F'_k(t_1, t_2) = \alpha \cdot F_k(t_1, t_2)^b$$ [Equation 2]

Referring to Equation 2, the traffic estimation value may be corrected by applying the nonlinear regression model to the traffic estimation value, and the number of objects passing the virtual measurement line 10 may be estimated through the corrected traffic estimation value ($F'_k$).

In particular, according to an embodiment of the present invention, the traffic estimation value may be corrected by applying the nonlinear regression model expressed as an exponential function to the traffic estimation value. Here, "a" and "b" may be optimally determined by repetitive experiments.

However, the nonlinear regression model applied to the present invention is not limited to only being expressed as the exponential function.

Respective components constituting the traffic measuring apparatus 100 using image analysis according to an embodiment of the present invention have been described as being arranged as respective component units, but at least two of the respective component units may be combined to form a single component unit, or a single component unit may be divided into a plurality of component units. An example in which these component units are combined and divided may also be included in the present invention without departing from the scope of the present invention.

In addition, operations of the traffic measuring apparatus 100 using image analysis according to an embodiment of the present invention may be implemented as a computer-readable program or code in a computer-readable recording medium. The computer-readable recording medium may include all kinds of recording devices where data that can be read by a computer system is stored. In addition, the computer-readable recording medium may be distributed in computer system connected via a network, so that a computer-readable program or code may be stored and executed in a distributed manner.

Figure 3A:
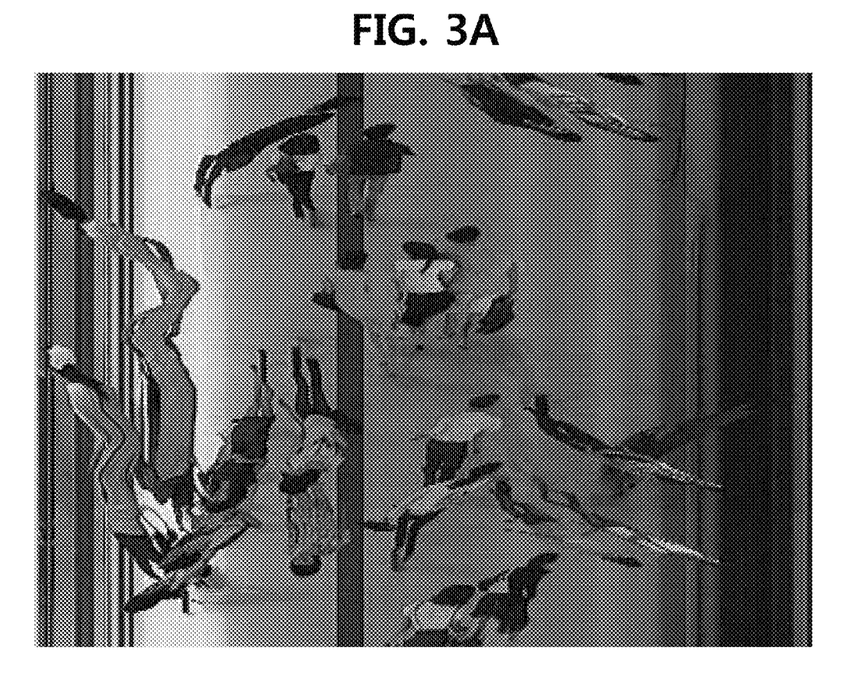
FIG. 3A is a drawing showing an example of a spatiotemporal domain image according to an embodiment of the present invention.
Figure 3B:
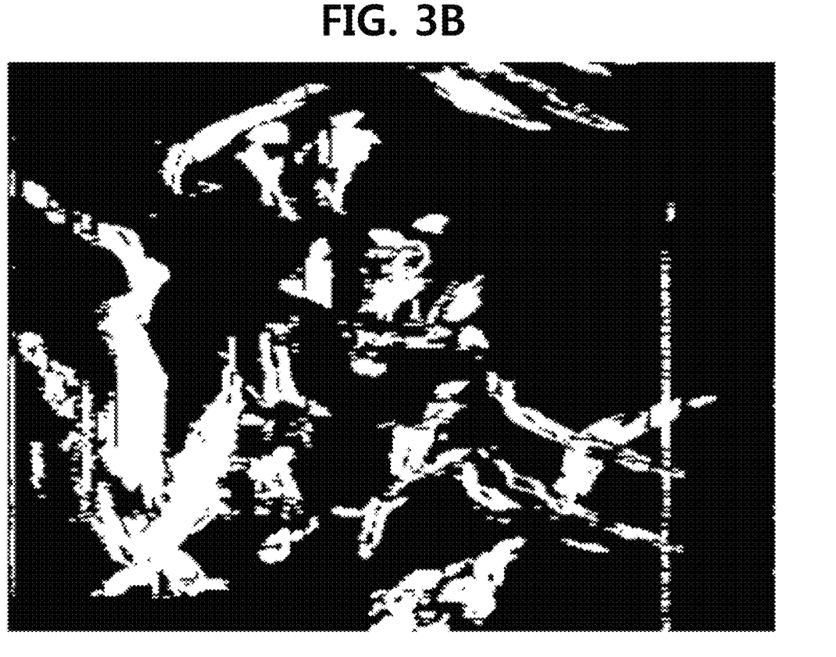
FIG. 3B is a drawing showing an example of a foreground region extracted from a spatiotemporal domain image according to an embodiment of the present invention.
Figure 3C:
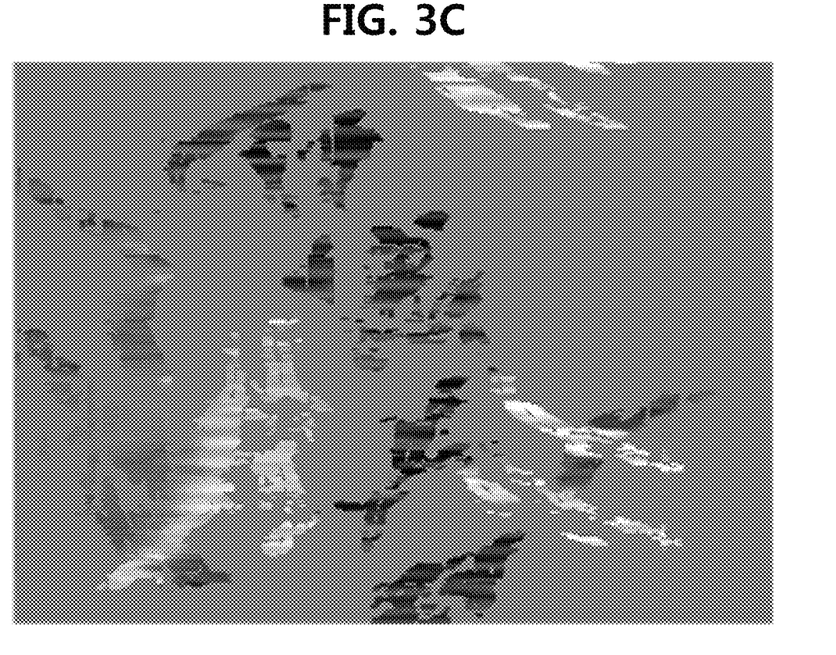
FIG. 3C is a drawing showing an example of a motion vector extracted from a spatiotemporal domain image according to an embodiment of the present invention.

FIG. 3A is a drawing showing an example of a spatiotemporal domain image according to an embodiment of the present invention, FIG. 3B is a drawing showing an example of a foreground region extracted from a spatiotemporal domain image according to an embodiment of the present invention, and FIG. 3C is a drawing showing an example of a motion vector extracted from a spatiotemporal domain image according to an embodiment of the present invention.

Referring to FIG. 3A, an input image may be expressed in a spatiotemporal domain by connecting corresponding pixels on each of consecutive frames constituting the input video with respect to a predetermined virtual measurement line 10.

A spatiotemporal domain image may include information about moving objects such as pedestrians, and the moving objects may include information about a movement direction and movement speed so as to be expressed in the spatiotemporal domain image.

For example, the moving objects may be expressed inclinedly in the movement direction, and expressed to have different lengths depending on the movement speed.

That is, the spatiotemporal domain image expressed in the spatiotemporal domain may be generated by connecting the corresponding pixels on each of the frames, and include information about movement of pixel positions over time unlike a general image.

Referring to FIG. 3B, a foreground region may be extracted from the spatiotemporal domain image. An area expressed as white in FIG. 3B is the foreground region.

The foreground region that is an area in which the moving objects are present may be extracted to be separated from a background region in the spatiotemporal domain. For example, by removing the previously stored background region from the input image, the foreground region may be extracted.

However, when traffic of the objects is large, an occlusion region that is a region in which the objects are viewed in an overlapping manner may be increased, and the estimated traffic may be measured smaller than actual traffic due to the occlusion region.

Referring to FIG. 3C, motion vectors with respect to the foreground region may be extracted from the spatiotemporal domain image. The foreground region may include information about the motion vector because of expressing moving objects. Here, the motion vector may include size and direction components.

For example, as shown in FIG. 3C, in the foreground region, a fast-moving object may be brightly expressed, and a slow-moving object may be darkly expressed.

According to an embodiment of the present invention, traffic of objects may be estimated using the foreground region and the motion vectors with respect to the foreground region in the spatiotemporal domain image.

In particular, according to an embodiment of the present invention, the virtual measurement line 10 may be set, and the foreground pixels positioned on the virtual measurement line 10 and the motion vectors with respect to the foreground pixels may be used as image features, thereby estimating traffic.

Figure 4:
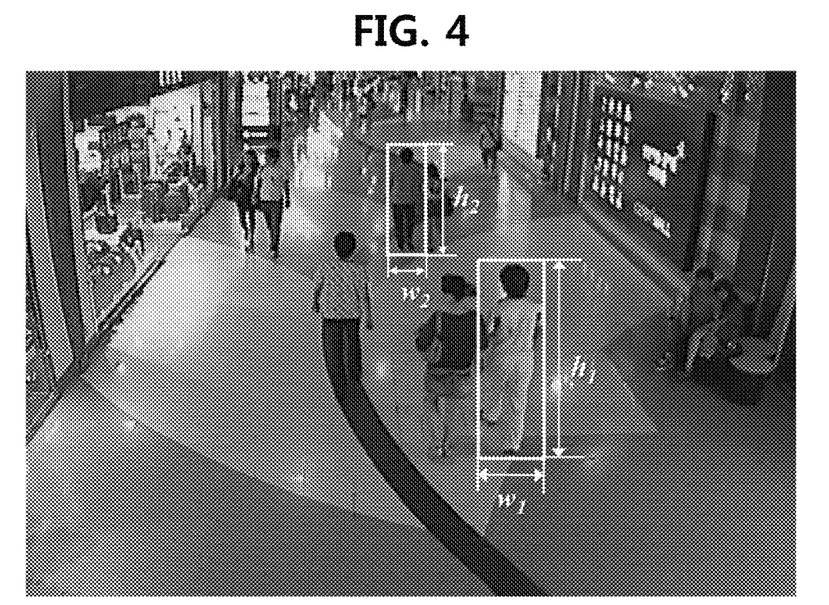
FIG. 4 is a drawing showing an example of normalization with respect to foreground pixels according to an embodiment of the present invention.

FIG. 4 is a drawing showing an example of normalization with respect to foreground pixels according to an embodiment of the present invention.

Referring to FIG. 4, an input image may include a background region and a foreground region. The foreground region may be a region in which moving objects are present, and expressed as a block having a width (w) and a height (h).

The foreground region may be expressed as pixels having mutually different sizes in accordance with the influence of camera perspective. That is, an object located far away from the camera may be expressed small in the input image, and an object located close to the camera may be expressed relatively large.

For example, the object located far away from the camera may be expressed as a block of $w_2 \times h_2$, and the object located close to the camera may be expressed as a block of $w_1 \times h_1$.

Accordingly, since the foreground pixels extracted from objects located in mutually different positions may have different sizes, a degree to which the foreground pixels contribute to estimation of traffic may vary.

In order to reduce such an influence, an average size of the objects to be predicted in each position of the input image may be defined, and a value corresponding to a reciprocal of the defined average size may be used as $\rho(s)$ applied in Equation 2, thereby normalizing the foreground pixels.

In addition, since an area occupied by a rectangular block (w×h) that is a region in which the objects are present is different from an area occupied by an actual object in the input image, a constant $\alpha$ may be applied so as to reduce such a difference. That is, in Equation 1, $\alpha$, which is smaller than 1, may be experimentally determined and applied.

Figure 5A:
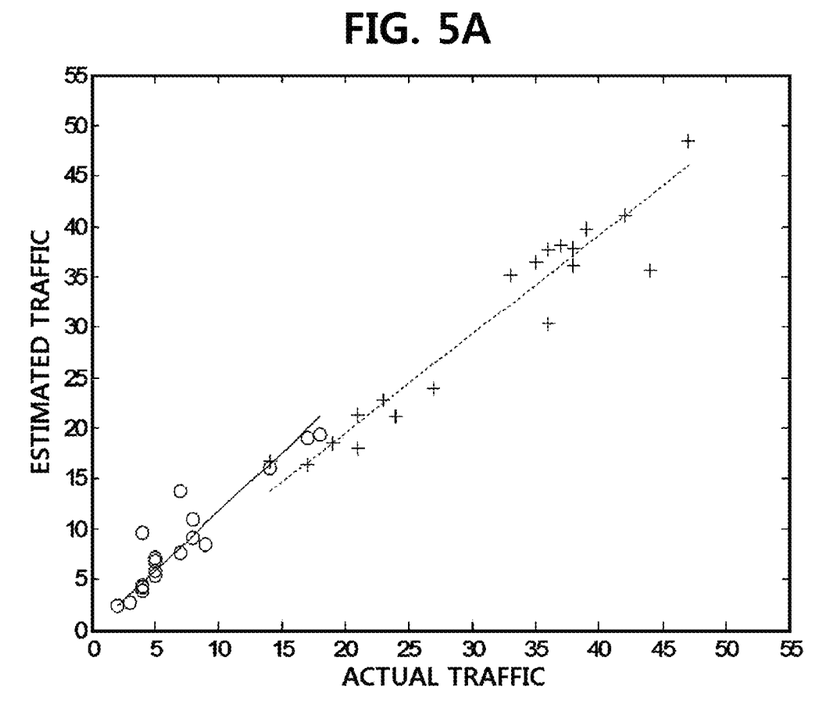
FIG. 5A is a graph comparing a traffic estimation value and actual traffic according to an embodiment of the present invention.
Figure 5B:
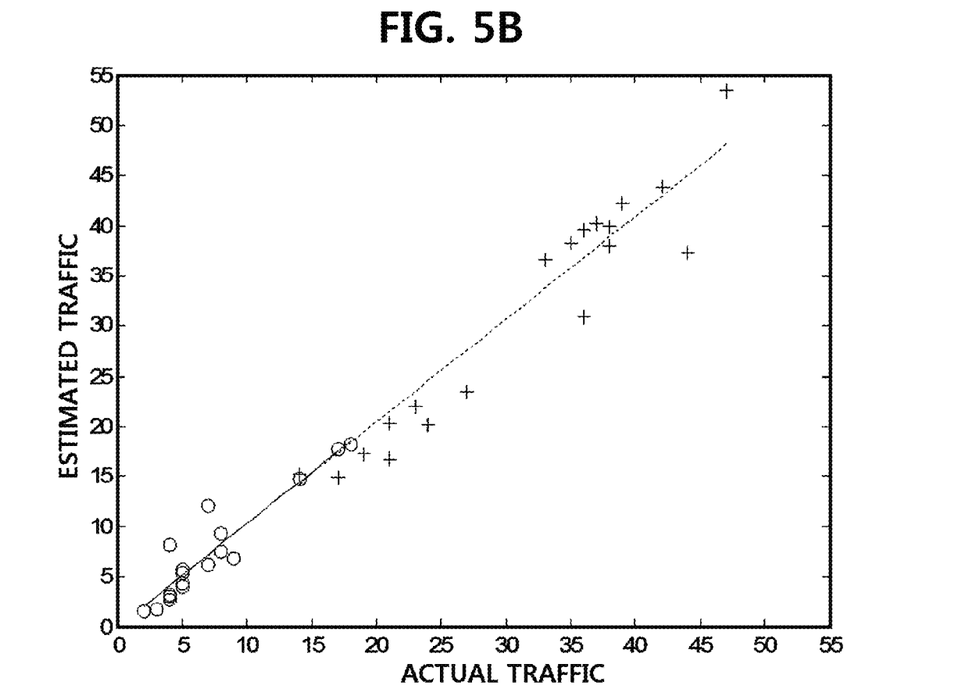
FIG. 5B is a graph comparing a corrected traffic estimation value and actual traffic according to another embodiment of the present invention.

FIG. 5A is a graph comparing a traffic estimation value and actual traffic according to an embodiment of the present invention, and FIG. 5B is a graph comparing a corrected traffic estimation value and actual traffic according to another embodiment of the present invention.

Referring to FIG. 5A, actual traffic and traffic estimated by a traffic estimation value are compared.

An interval in which the number of moving objects is large with respect to an interval in which the number of objects is about 15 to 20, and an interval in which the number of moving objects is small may be separated. For example, traffic is expressed as "X" in the interval in which the number of moving objects is relatively large, and traffic is expressed as "O" in the interval in which the number of moving objects is relatively small.

Referring to FIG. 5A, it can be found that the interval in which the number of moving objects is small has a larger inclination than the interval in which the number of moving objects is large. That is, in the interval in which the number of moving objects is small, the inclination is almost close to 1, but in the interval in which the number of moving objects is large, the inclination is smaller than 1.

This is because the occlusion region that is a region in which objects are viewed in the overlapping manner is increased according to an increase in the number of moving objects, and therefore the estimated traffic may be estimated smaller than the actual traffic.

Referring to FIG. 5B, actual traffic and traffic estimated by a corrected traffic estimation value are compared. The traffic estimation value may be corrected by applying the nonlinear regression model, and in particular, a corrected traffic estimation value may be calculated by applying the nonlinear regression model expressed as an exponential function to the traffic estimation value.

Referring to FIG. 5B, it can be found that the interval in which the number of moving objects is small and the interval in which the number of moving objects is large have almost similar inclinations. That is, the inclination of each of the interval in which the number of moving objects is small and the interval in which the number of moving objects is large is almost close to 1.

Accordingly, it can be found that when performing correction by applying the nonlinear regression model to the traffic estimation value, the estimated traffic closer to the actual traffic may be obtained.

Figure 6A:
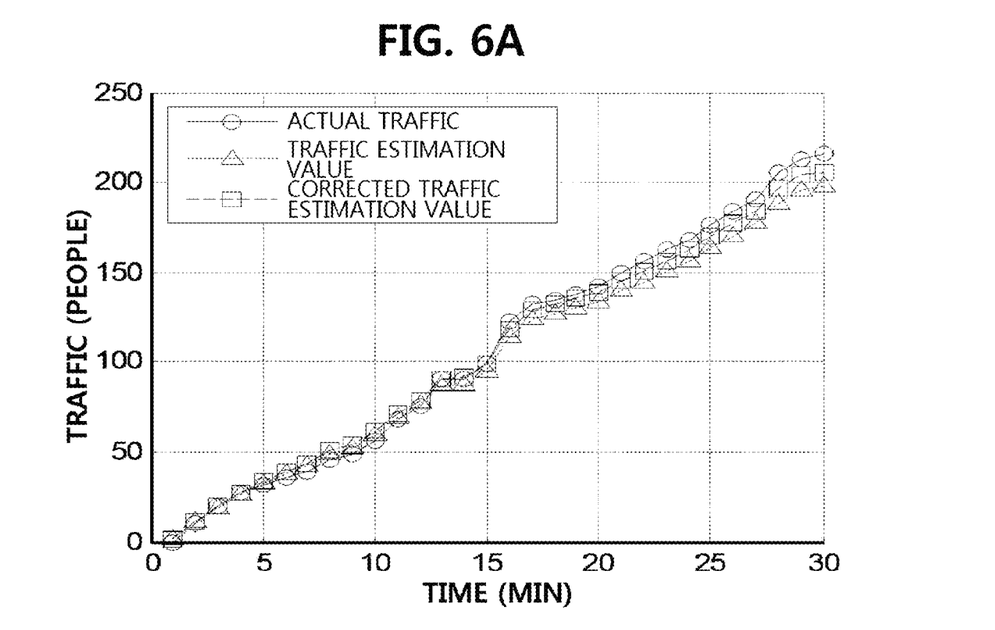
FIG. 6A is a graph comparing a traffic estimation value, a corrected traffic estimation value, and actual traffic according to an embodiment of the present invention.
Figure 6B:
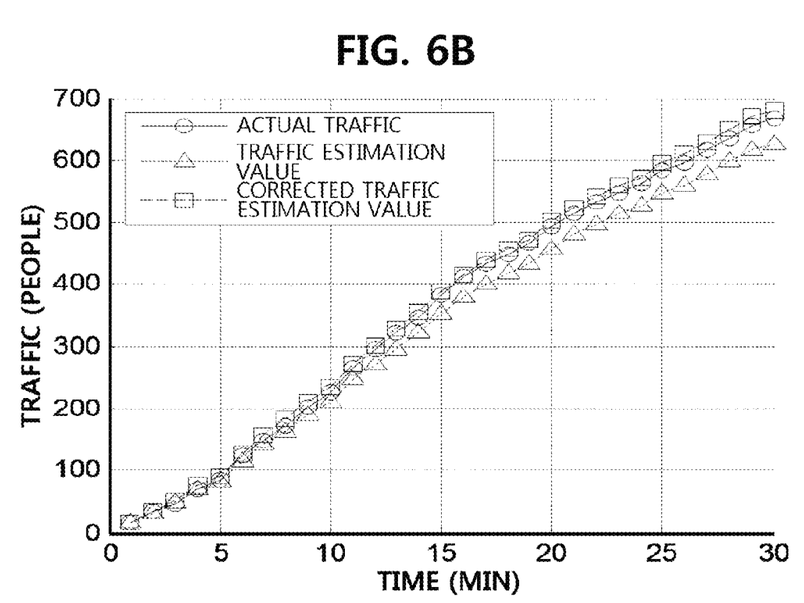
FIG. 6B is a graph comparing a traffic estimation value, a corrected traffic estimation value, and actual traffic according to an embodiment of the present invention.

FIG. 6A is a graph comparing a traffic estimation value, a corrected traffic estimation value, and actual traffic according to an embodiment of the present invention, and FIG. 6B is a graph comparing a traffic estimation value, a corrected traffic estimation value, and actual traffic according to an embodiment of the present invention.

FIGS. 6A and 6B are graphs with respect to traffic measured in different time zones. FIG. 6A shows traffic measured in a time zone in which traffic is light, and FIG. 6B shows traffic measured in a time zone in which traffic is heavy.

Referring to FIG. 6A, it can be found that actual traffic, traffic estimated by a traffic estimation value, and traffic estimated by a corrected traffic estimation value are measured almost similar.

Referring to FIG. 6B, it can be found that actual traffic and traffic estimated by a corrected traffic estimation value are measured almost similar. However, it can be found that the traffic measured by the traffic estimation value is lighter than the traffic estimated by the actual traffic or the corrected traffic estimation value.

That is, the traffic estimated by the traffic estimation value may be measured lighter than the actual traffic because the occlusion region in which the objects are viewed in the overlapping manner is increased according to an increase in the traffic.

Accordingly, according to an embodiment of the present invention, it can be found that the corrected traffic estimation value may be calculated by applying the nonlinear regression model to the traffic estimation value, and the traffic may be estimated using the corrected traffic estimation value, thereby obtaining more accurate results.

Figure 7:
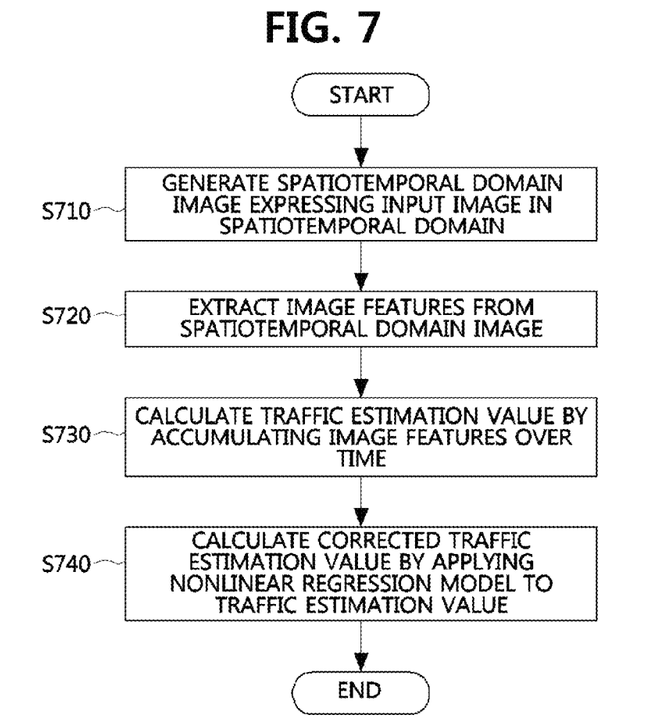
FIG. 7 is a flowchart showing a traffic measuring method according to an embodiment of the present invention.

FIG. 7 is a flowchart showing a traffic measuring method according to an embodiment of the present invention.

Referring to FIG. 7, a traffic measuring method according to an embodiment of the present invention includes generating a spatiotemporal domain image in step S710, extracting image features in step S720, calculating a traffic estimation value by accumulating the image features in step S730, and calculating a corrected traffic estimation value by applying a nonlinear regression model in step S740.

First, the traffic measuring method according to an embodiment of the present invention may be performed in an information processing device enabling digital signal processing.

An input image may be an image obtained through a camera having an inclined point of view as an image captured using a CCTV or the like, and traffic of objects such as pedestrians may be measured through analysis of the input image.

The input image may be expressed in a spatiotemporal domain by connecting corresponding pixels on each of consecutive frames constituting the input image with respect to a predetermined virtual measurement line 10 in step S710, and an image expressed in the spatiotemporal domain may be referred to as a spatiotemporal domain image.

Accordingly, the spatiotemporal domain image may include information about movement of pixel positions over time unlike a general image.

In step S720, the traffic measuring method may include extracting image features through analysis of the spatiotemporal domain image.

Foreground pixels expressing objects based on pixels positioned on the virtual measurement line 10 may be extracted from the spatiotemporal domain image.

The pixels positioned on the virtual measurement line 10 may be divided into pixels expressing a background and pixels expressing moving objects, and foreground pixels expressing moving objects among the pixels positioned on the virtual measurement line 10 may be extracted.

The foreground pixels may be expressed as pixels having mutually different sizes by the influence of camera perspective, and normalization with respect to the foreground pixels may be performed. The normalization with respect to the foreground pixels may be performed based on an average size to be predicted in each of positions of the objects.

In addition, motion vectors with respect to the foreground pixels may be extracted from the spatiotemporal domain image using the pixels positioned on the virtual measurement line 10.

In step S730, the image features expressed as the foreground pixels and the motion vectors with respect to the foreground pixels may be extracted, and a traffic estimation value may be calculated by reflecting, in the foreground pixels, the motion vectors with respect to the foreground pixels and accumulating the motion vectors.

In addition, the traffic estimation value may be calculated by reflecting the motion vectors with respect to the foreground pixels in the normalized foreground pixels.

Accordingly, traffic of the objects may be estimated based on the traffic estimation value.

In addition, in step S740, the traffic measuring method according to an embodiment of the present invention may include performing correction with respect to the traffic estimation value in order to estimate more accurate traffic when the number of moving objects is large.

A corrected traffic estimation value may be calculated by applying the nonlinear regression model to the traffic estimation value, and the number of objects passing the virtual measurement line 10 may be estimated through the corrected traffic estimation value.

In particular, the traffic estimation value may be corrected by applying, to the traffic estimation value, the nonlinear regression model expressed as an exponential function.

The traffic measuring method according to an embodiment of the present invention may be performed by the above-described traffic measuring apparatus 100. Accordingly, the traffic measuring method may be more accurately understood with reference to the descriptions concerning the above-described traffic measuring apparatus 100.

The traffic measuring apparatus 100 and method using image analysis according to an embodiment of the present invention may accurately measure traffic of objects such as pedestrians through analysis of an input image so as to be utilized in a variety of fields.

For example, the information about traffic of the pedestrians may be utilized in market analysis such as visitor statistic analysis, marketing effect analysis, and also utilized in large public areas or building automation fields such as indoor heating and cooling control.

The traffic measuring apparatus and method using the image analysis according to an embodiment of the present invention may accurately measure the traffic of the objects such as pedestrians through analysis of an image expressed in the spatiotemporal domain.

In addition, analysis of the image expressed in the spatiotemporal domain may reduce complexity compared to analysis of a general image, thereby measuring traffic of objects such as pedestrians in real-time.

In addition, the traffic measuring apparatus and method using the image analysis according to an embodiment of the present invention may be effectively utilized in market analysis such as visitor statistic analysis or marketing effect analysis or in large public areas or building automation fields such as indoor heating and cooling control.

In addition, by utilizing the image obtained using a camera having an inclined point of view such as CCTV or the like, it is possible to effectively measure traffic of objects such as pedestrians.

While the example embodiments of the present invention and their advantages have been described in detail, it should be understood that various changes, substitutions and alterations may be made herein without departing from the scope of the invention.

What is claimed is:

1. A traffic measuring apparatus comprising:
a processor executing computer program instructions stored on a non-transitory computer-readable media, wherein executing the computer program instructions causes the traffic measuring apparatus to set a virtual measurement line in an input image, generate a spatiotemporal domain image expressing the input image in a spatiotemporal domain based on the virtual measurement line, and extract image features from the spatiotemporal domain image; and
estimate the number of objects passing the virtual measurement line by accumulating the image features over time,
wherein the spatiotemporal domain image is generated by connecting corresponding pixels on each of consecutive frames constituting the input image with respect to the virtual measurement line.

2. The traffic measuring apparatus of claim 1, wherein the image features are foreground pixels expressing the objects or motion vectors with respect to the foreground pixels.

3. The traffic measuring apparatus of claim 1, wherein the objects are pedestrians.

4. The traffic measuring apparatus of claim 1, wherein executing the computer program instructions causes the traffic measuring apparatus to extract foreground pixels expressing the objects from the spatiotemporal domain image based on pixels positioned on the virtual measurement line, and extract, from the spatiotemporal domain image, motion vectors with respect to the foreground pixels using the pixels positioned on the virtual measurement line.

5. The traffic measuring apparatus of claim 4, wherein executing the computer program instructions causes the traffic measuring apparatus to normalize the foreground pixels, accumulate the normalized foreground pixels to thereby calculate a traffic estimation value, and estimate the number of the objects passing the virtual measurement line through the traffic estimation value.

6. The traffic measuring apparatus of claim 5, wherein executing the computer program instructions causes the traffic measuring apparatus to calculate the traffic estimation value by reflecting the motion vectors with respect to the foreground pixels in the normalized foreground pixels.

7. The traffic measuring apparatus of claim 6, wherein executing the computer program instructions causes the traffic measuring apparatus to correct the traffic estimation value by applying a nonlinear regression model to the traffic estimation value, and estimate the number of the objects passing the virtual measurement line through the corrected traffic estimation value.

8. The traffic measuring apparatus of claim 7, wherein executing the computer program instructions causes the traffic measuring apparatus to correct the traffic estimation value by applying the nonlinear regression model expressed as an exponential function to the traffic estimation value.

9. A traffic measuring method which is performed in an information processing device enabling digital signal processing, the method comprising:
setting a virtual measurement line in an input image and generating a spatiotemporal domain image expressing the input image in a spatiotemporal domain based on the virtual measurement line;
extracting image features from the spatiotemporal domain image; and
estimating the number of objects passing the virtual measurement line by accumulating the image features over time,
wherein the spatiotemporal domain image is generated by connecting corresponding pixels on each of consecutive frames constituting the input image with respect to the virtual measurement line.

10. The traffic measuring method of claim 9, wherein the input image is obtained through a camera having an inclined point of view.

11. The traffic measuring method of claim 9, wherein the objects are pedestrians.

12. The traffic measuring method of claim 9, wherein the extracting includes extracting, from the spatiotemporal domain image, foreground pixels expressing the objects and motion vectors with respect to the foreground pixels based on pixels positioned on the virtual measurement line.

13. The traffic measuring method of claim 12, wherein the estimating includes normalizing the foreground pixels, accumulating the normalized foreground pixels to thereby calculate a traffic estimation value, and estimating the number of the objects passing the virtual measurement line through the traffic estimation value.

14. The traffic measuring method of claim 13, wherein the estimating includes calculating the traffic estimation value by reflecting the motion vectors with respect to the foreground pixels in the normalized foreground pixels.

15. The traffic measuring method of claim 14, wherein the estimating includes correcting the traffic estimation value by applying a nonlinear regression model to the traffic estimation value, and estimating the number of the objects passing the virtual measurement line through the corrected traffic estimation value.

16. The traffic measuring method of claim 15, wherein the estimating includes correcting the traffic estimation value by applying the nonlinear regression model expressed as an exponential function to the traffic estimation value.

17. A non-transitory recording medium in which a program of instruction which can be executed by a digital processing device for performing a traffic measuring method through analysis of an image expressed in a spatiotemporal domain is tangibly implemented, and a program which can be read by the digital processing device is recorded, the recording medium executing:
setting a virtual measurement line in an input image and generating a spatiotemporal domain image expressing the input image in a spatiotemporal domain based on the virtual measurement line;
extracting image features from the spatiotemporal domain image; and
estimating the number of objects passing the virtual measurement line by accumulating the image features over time,
wherein the spatiotemporal domain image is generated by connecting corresponding pixels on each of consecutive frames constituting the input image with respect to the virtual measurement line.

* * * * *